July 4, 1950  J. A. HASSAN  2,513,797
SKIN OPENER
Filed Aug. 16, 1946  2 Sheets-Sheet 1

Inventor
Joseph A. Hassan
By
Wooster T. Davis
Attorneys

July 4, 1950  J. A. HASSAN  2,513,797
SKIN OPENER
Filed Aug. 16, 1946  2 Sheets-Sheet 2
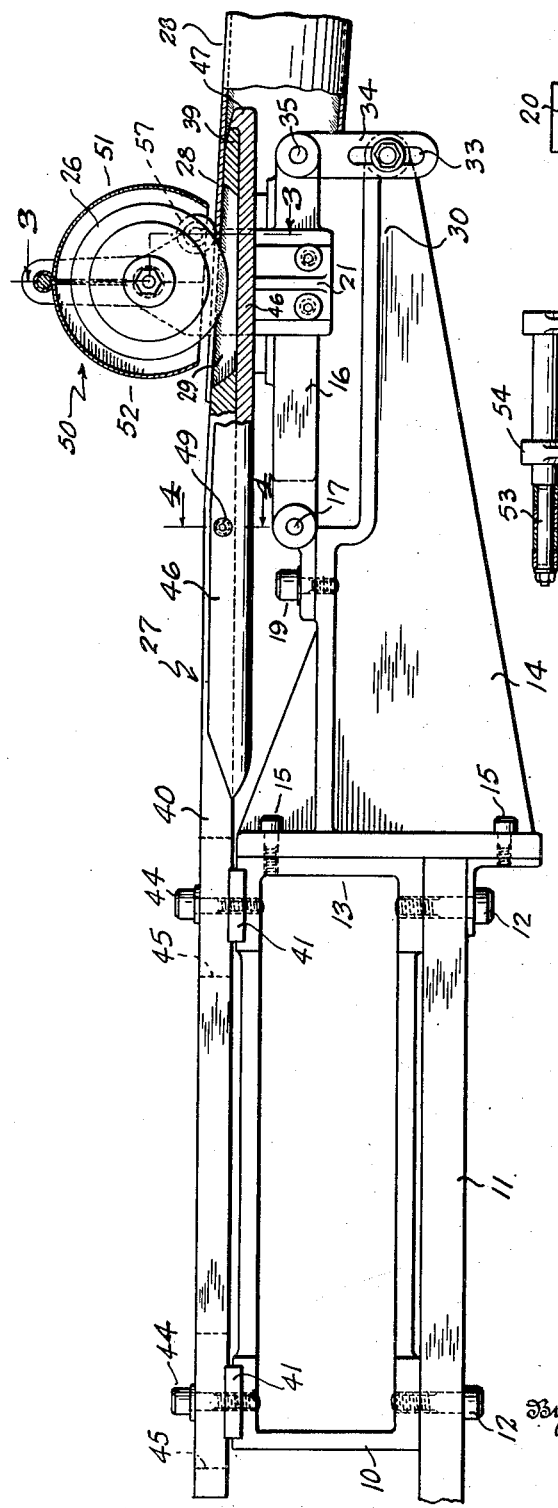
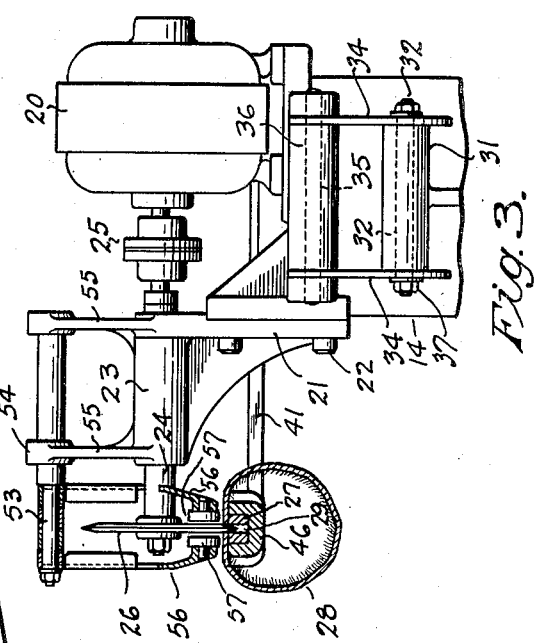
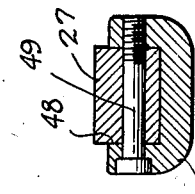
Inventor
Joseph A. Hassan
By Wooster & Davis
Attorneys Patented July 4, 1950

2,513,797

UNITED STATES PATENT OFFICE 2,513,797

SKIN OPENER

Joseph A. Hassan, Danbury, Conn.

Application August 16, 1946, Serial No. 690,925

5 Claims. (Cl. 164—60)

This invention relates to a skin opener for opening the fur "sleeves" or skins of rabbits and similar animals preparatory to treating the fur and preparing it for felting, making felt hats, and similar articles, and has for an object to provide a machine for opening these skins or sleeves to do away with the hand labor now generally employed, and which will make it easier and will be less exacting on the operator than the old hand method.

Another object is to provide a device for opening these skins which will give a cleaner cut and produce less small pieces and thus will save fur.

Another object is to provide a device which will give a straight, smooth, clean cut without producing jagged edges, as common with the hand opening method, which jagged edges in later operation might cause pieces to be torn off with consequent loss of fur.

A further object is to provide a construction which may be used for opening all types and sizes of rabbit and similar skins, both the large or Australian skin as well as the smaller "butcher" and English and French skins.

With the foregoing and other objects in view I have devised the construction illustrated in the accompanying drawing forming a part of this specification. It is, however, to be understood the invention is not limited to the specific details of construction and arrangement shown, but may embody various changes and modifications within the scope of the invention.

In these drawings:

Fig. 2 is a side elevation with parts broken away to more clearly show the construction;

Fig. 3 is a front view looking from the right of Fig. 2 with parts shown in section to clearly show the construction, the plane of the section being substantially on the line 3—3 of Fig. 2, and Fig. 4 is a transverse section substantially on line 4—4 of Fig. 2.

Figure 1:
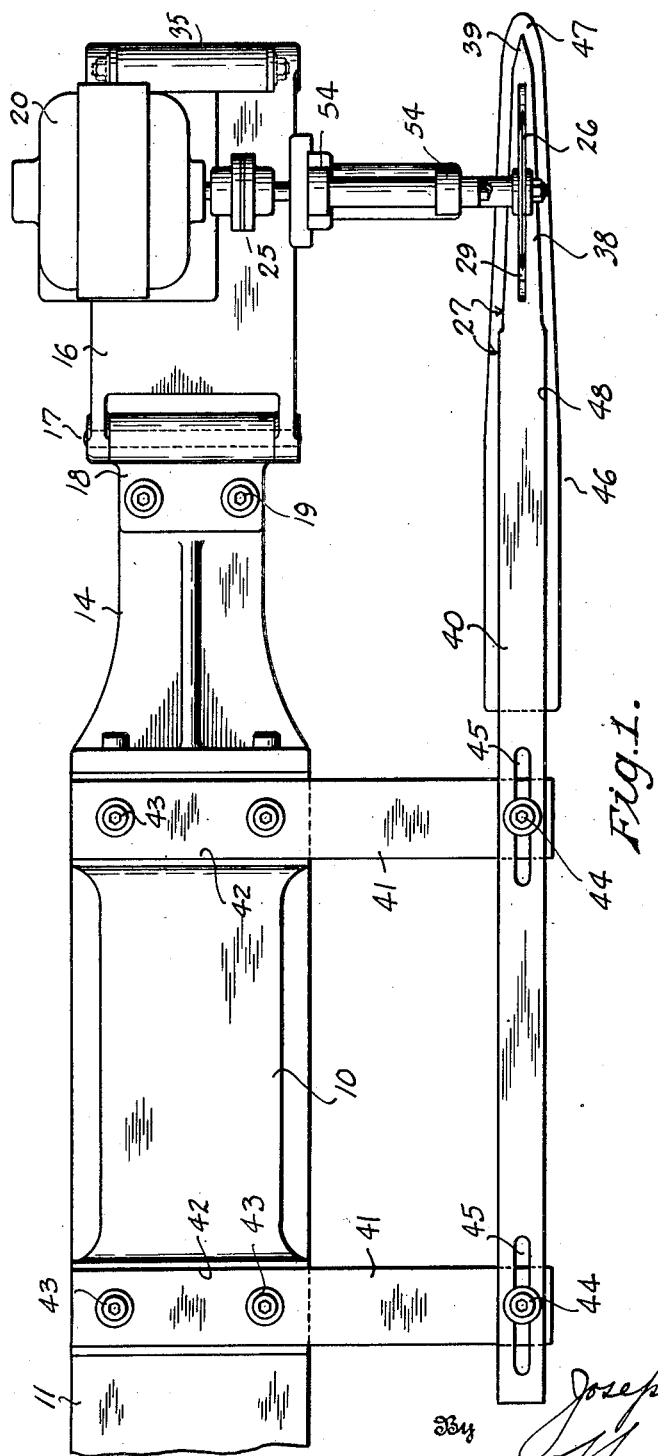
Fig. 1 is a top plan view of the machine with the guard of the knife removed.

At the present time the fur "sleeves" or skins, such for example, as rabbit or similar skins are opened by cutting longitudinally along the belly side by hand operation, the skin being placed over an upright forked or longitudinally slotted support and then the operator running a sharp knife along the front side in the slot or fork to open the skin. This is a tedious, boring and monotonous operation, requiring skill and speed. As it requires the use of a very sharp knife, it is quite dangerous, and often small pieces are cut off, as at the legs, and the skin may be cut with a jagged edge which in later operations might cause pieces of the skin to be torn off, with consequent loss of fur. Furthermore, it is difficult to get operators for performing this type of work.

The present machine has therefore been developed to perform this operation more expeditiously and more easily, so that it is less exacting on the operator, and will also do a better job because it gives a more uniform, straight, smooth clean cut, which reduces the liability of later loss of fur in subsequent operations in treating and preparing the fur.

The machine comprises a supporting frame 10, which in the present instance is an open four sided frame adapted to be mounted on any suitable support, such, for example, as an arm 11 extending forwardly from a bench or the like, and may be secured to this arm by any suitable means, such as the screws 12. Mounted on the upright forward wall 13 of the frame is a supporting bracket 14 and secured by any suitable means such as the screws 15. Mounted on this bracket is a motor support 16 hinged to the bracket 17 by means of a hinged member 18 secured on the top of the bracket by any suitable means, such as the screws 19. This support carries an electric motor 20, and at one side carries a shaft bracket 21 secured by any suitable means, such as the screws 22, and has a suitable bearing 23 for a shaft 24 secured to the motor shaft by any suitable coupling 25. At the other side of the bearing 23 it carries a rotary disc knife 26 operating over a guide and supporting bar 27 for the skin or sleeve 28 to be opened. As the motor support 16 may be swung up and down about the hinge 17, the position of the knife higher or lower with respect to the guide bar 27 may be varied, this bar preferably having a longitudinal slot 29 extending downwardly from its upper edge into which the lower edge of the knife disc projects a short distance, as shown in Figs. 2 and 3, so that the knife edge passes clear through the skin. The bracket 14 includes a forwardly projecting arm 30 under the motor support provided at its forward end with a transverse bearing 31 with a bolt 32 extending at its opposite ends through elongated slots 33 in a pair of upright supporting links 34, which links on their upper ends are pivoted to a pivot pin 35 in the bearing 36 at the front end of the motor support 16. Clamping nuts 37 on the bolt 32 permit clamping of the links 34 in the adjusted positions. Therefore, by loosening these nuts the forward end of the motor support 16 may be swung up or down about the pivot 17 to vary the height of the knife with respect to guide bar 27, and then after adjustment may be clamped in adjusted position by tightening these nuts.

The skin guiding and supporting bar 27 has a narrow forward portion 38 under the knife in which the slot 29 is formed and has a narrow pointed forward end 39 which may be inserted and passed through narrow or closed skins and also the leg or snoot portion. This narrow pointed portion is an extension of a heavier body portion 40 which rests on lateral supports 41 mounted in transverse grooves 42 in the top of the frame 10 and secured therein by any suitable means, such as the screws 43. These bars project a suitable distance laterally from the frame, and the bar 27 is seated on top of them and adjustably mounted thereon by any suitable means, such as the clamping screws 44 extending through elongated longitudinal slots 45 in the bar. By loosening these screws the bar may be adjusted longitudinally to properly position the pointed forward end 39 and the slot 29 with respect to the knife disc 26.

As there is a great variation in sizes of skins or sleeves, an auxiliary bar or support 46 is provided which is wider than the bar 27 and has a more rounded and less pointed and wider forward end 47. It is provided with a longitudinal slot 48 in its top wall of a size and shape to receive and fit the forward portions of the bar 27, the top surface of this auxiliary bar or support being preferably on about the same level as the top surface of the bar 27, and the sharp narrow point 39 of the first bar is therefore enclosed in and covered and protected by the wider, more blunt free end portion of the auxiliary bar. This auxiliary bar is detachably held to the first bar by any suitable means, such as the transverse screw 49. The bar 27 is preferably of steel, although it could be of other materials, and the auxiliary bar 46 is preferably of aluminum, although it could be of wood, plastic or other material.

In operation, in opening or longitudinal slitting smaller and more closely compacted skins, such as those called "butcher" skins, and the English and French skins, which are often very narrow, the auxiliary bar or support is removed and the skins are passed longitudinally over the top of the outer and pointed end portion of the slimmer bar 27, the pointed narrower end 39 readily passing through the skins and the leg portions thereof by sliding the skins backwardly from the pointed end with the belly side up, and also through the legs, thus passing it along this bar under the rotating knife, which cleanly and quickly opens the skin longitudinally with a clean, smooth cut. In the so-called French skin, the snoot end is long and narrow and is quite often substantially closed, and this narrow pointed bar readily passes through to permit opening up or slitting of the skin. In the larger or Australian skin, however, it is better to use the larger and less pointed bar, as there is more room for the bar to pass through and the less pointed bar is less apt to be caught in the skin. With this type of skin the auxiliary bar 46 with the more rounded, wider and less pointed end is applied to the bar 47. In any case, the sleeve or skin is passed by the knife by inserting one end over the free end of the supporting bar and passing the sleeve longitudinally and backwardly over the top of the bar by gripping it on opposite sides of the bar and sliding it backwardly past the rotating knife, which slits or opens it longitudinally from end to end so that it may be laid out flat for such operations as preparing the fur, such, for example, as carroting or other operations.

In order to protect the operator from the rapidly rotating disc knife 26, it is covered with a suitable guard 50. This may be a suitable guard mounted in any suitable way, but in the arrangement shown comprises forward and rear sections 51 and 52 pivoted above the knife to a laterally extending rod 53 mounted in suitable bearings 54 in upwardly extending arms 55 in the bracket 21. These guard sections extend over the outer edge of the knife and down on opposite sides, as shown at 56, to prevent the operator getting her hand or fingers in a position where they might be injured by the knife. If desired, side rollers 57 may be mounted in the guard on opposite sides of the knife a short distance above the guide and supporting bar 27 to help guide the skin 28 along the top of the supporting bar and prevent it from rising too far above this bar during the opening operation. The guard sections may be swung upwardly about their pivotal support to permit access to the knife, or to permit changing or renewal of the knife.

Having thus set forth the nature of my invention, I claim:

1. A skin opener of the character described, comprising a frame, an elongated pointed guide bar mounted on the frame to support a closed skin as it is slid along the bar from its pointed end, said bar being provided with a longitudinal slot in its top surface inwardly from said end, a rotary vertical knife disc mounted over said bar in alignment with said slot, means for mounting the knife for adjustment toward and from the bar, means for mounting the bar for longitudinal adjustment, and means for rotating the knife.

2. A skin opener of the character described comprising a rotary knife disc, means for rotating the knife, an elongated relatively narrow pointed guiding and supporting bar under the knife adapted to support and guide closed skins for longitudinal movement on the bar past the knife, an auxiliary supporting bar wider than the first bar provided with a longitudinal groove in its top surface of substantially the size and shape of the end portion of the first bar in which the first bar is seated and enclosed, and means for detachably securing the auxiliary bar to the first bar.

3. A skin opener of the character described comprising a rotary knife disc, means for rotating the knife, an elongated relatively narrow pointed guiding and supporting bar under the knife adapted to support and guide closed skins for longitudinal movement on the bar past the knife, said bar being provided with a longitudinal slot in its upper surface into which the lower edge of the knife may project, means for relatively shifting the knife and bar to adjust the position of the knife in the slot, an auxiliary bar of greater width and less pointed outer end than the first bar, said auxiliary bar being provided with an elongated recess in its top surface of substantially the size and shape of the end portion of the first bar and adapted to receive and enclose said end portion, and means for detachably securing the auxiliary bar on the first bar.

4. A skin opener of the character described comprising a frame, means for mounting an elongated substantially horizontal and substantially straight pointed bar on the frame to permit closed skins to be slid along the bar from the pointed end, said bar being provided with a longitudinal slot in its top surface, a motor support pivoted to the frame for up and down movement, a vertical rotary disc knife mounted on said support above the bar with its lower edge in said slot, a motor on the support for rotating the knife, and means for securing the support in adjusted positions.

5. A skin opener of the character described comprising a frame, an elongated, pointed guide bar mounted on the frame to support a closed skin as it is slid along the bar from its pointed end, said bar being provided with a longitudinal slot in one side thereof inwardly from the pointed end, a rotary knife disc mounted at one side of the bar in alignment with said slot and in a plane extending longitudinally of the bar so that the edge of the knife may extend into the slot, means for relatively shifting the knife and bar toward and from each other to adjust the amount the knife edge extends into the slot, means for relatively adjusting the knife and bar longitudinally of the bar to adjust the longitudinal position of the knife in the slot, and means for rotating the knife.

JOSEPH A. HASSAN.

REFERENCES CITED

The following references are of record in the file of this patent:

UNITED STATES PATENTS

| Number | Name | Date |
| --- | --- | --- |
| 541,304 | Young | June 18, 1895 |
| 589,444 | Sackett | Sept. 7, 1897 |
| 1,298,005 | Chatfield | Mar. 25, 1919 |
| 1,854,426 | Redemske | Apr. 19, 1932 |
| 1,919,899 | Meyer et al. | July 25, 1933 |

FOREIGN PATENTS

| Number | Country | Date |
| --- | --- | --- |
| 309,991 | Germany | Dec. 31, 1918 |